United States Patent [19]

Miller et al.

[11] Patent Number: 4,945,641

[45] Date of Patent: Aug. 7, 1990

[54] CHAIN SAW SAFETY GUARD

[76] Inventors: Clifton L. Miller, 3 Riverview Rd., Riverside, Launceston Tas.; Ronald L. Kerrison, 171 Roseveares Dr., Legana, Tas. both of Australia

[21] Appl. No.: 184,687

[22] Filed: Apr. 22, 1988

[30] Foreign Application Priority Data

Apr. 24, 1987 [AU] Australia .................... PI1592

[51] Int. Cl.[5] .................... B23D 57/02

[52] U.S. Cl. .................... 30/382; 30/378

[58] Field of Search .................... 30/381, 382, 383, 378

[56] References Cited

U.S. PATENT DOCUMENTS

| | | | |
|---|---|---|---|
| 4,257,162 | 3/1981 | Pardon | 30/382 X |
| 4,294,012 | 10/1981 | Lanz | 30/382 |
| 4,524,519 | 6/1985 | Muehling | 30/382 |

*Primary Examiner*—Frank T. Yost
*Assistant Examiner*—Willma Fridie, Jr.
*Attorney, Agent, or Firm*—Dennison, Meserole, Pollack & Scheiner

[57] ABSTRACT

A protective device for a chain saw comprising a generally U-shaped mounting bracket carrying pivot means pivotally supporting an elongate protecting bar spring biased towards a rest position in which the bar extends generally parallel to the chain of the chain saw in use, mounting plate means secured to one side of said mounting bracket and having a rearwardly extending portion formed with openings through which the chain bar mounting bolts of the chain saw pass for securement of said mounting plate to the body of the chain saw by means of the chain bar mounting nuts. The protecting bar has an inverted channel shaped configuration which defines a saw dust confining passage through which the saw dust passes in use. The protecting bar extends beyond the end of the chain of the chain saw to enable contact between the bar and the object to be cut without contact between the chain saw and the object. In one embodiment, a further protecting bar is attached to the lower portion of the mounting bracket to extend along the lower run of the chain of the chain saw.

11 Claims, 2 Drawing Sheets

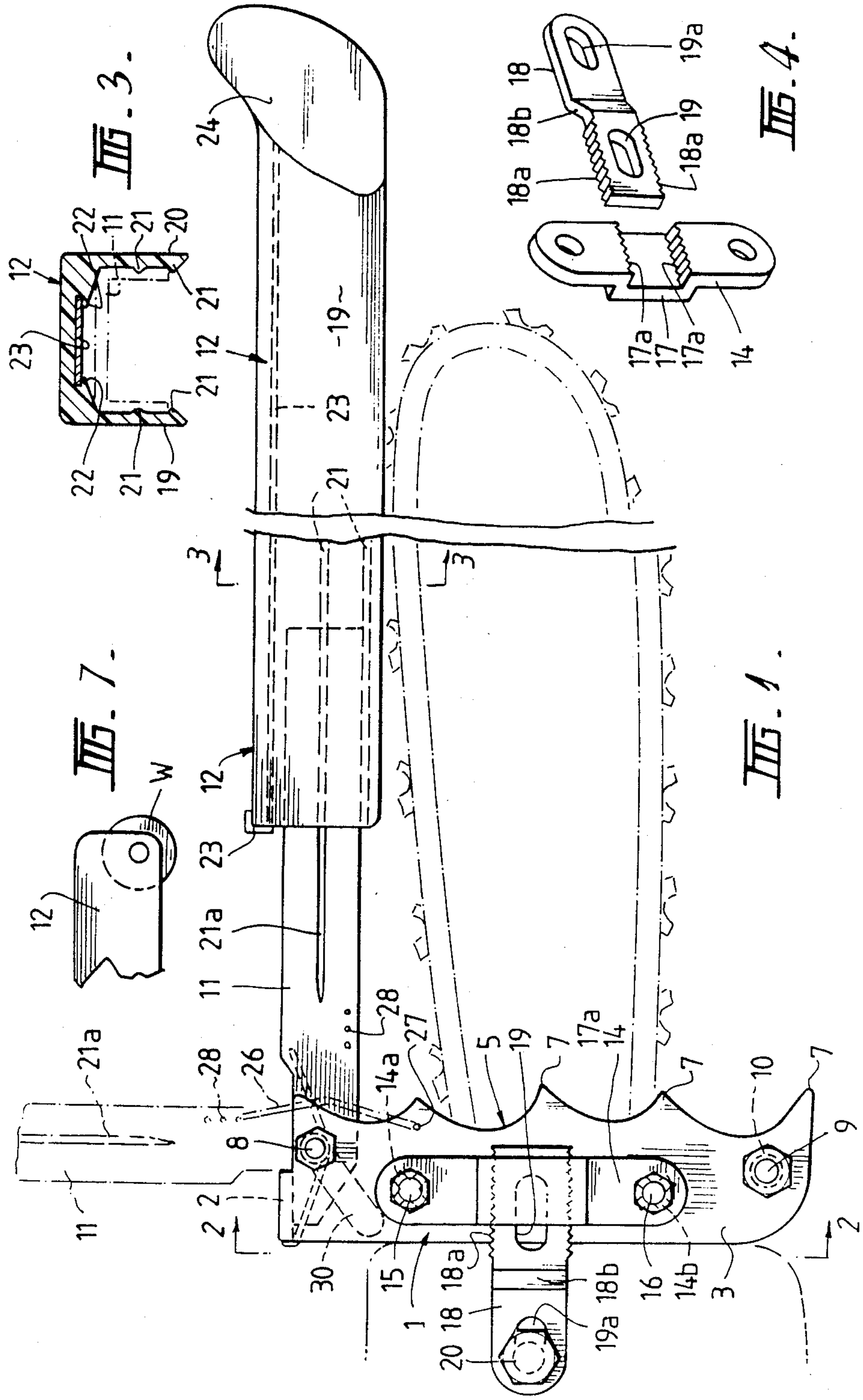

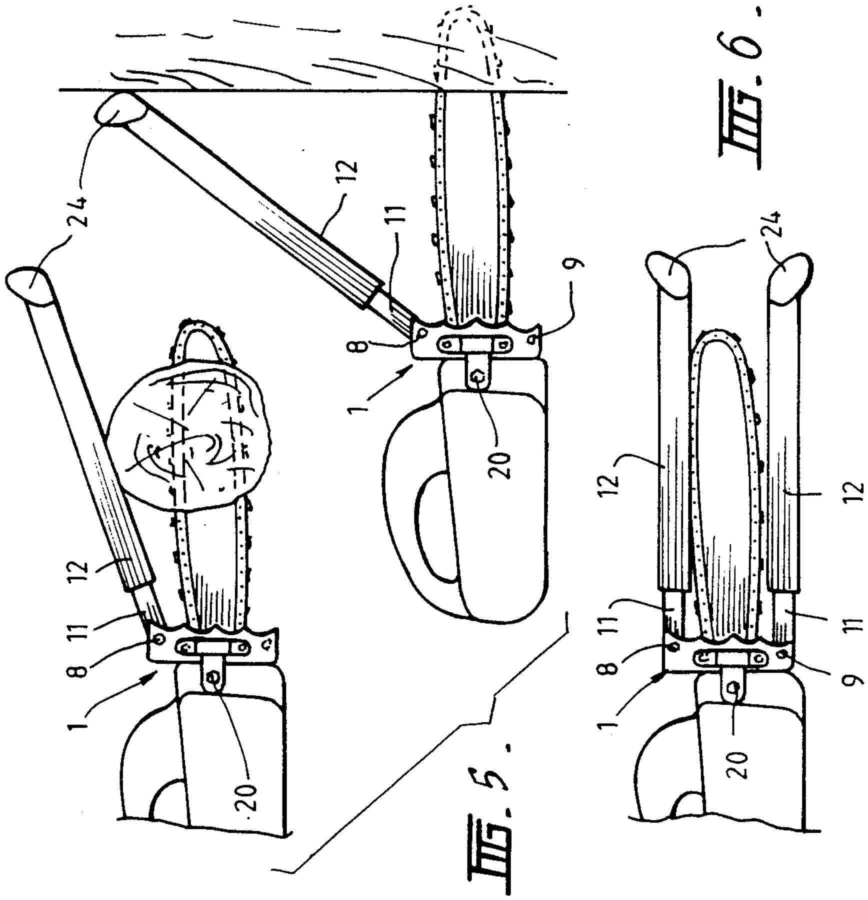
FIG. 5.
FIG. 6.
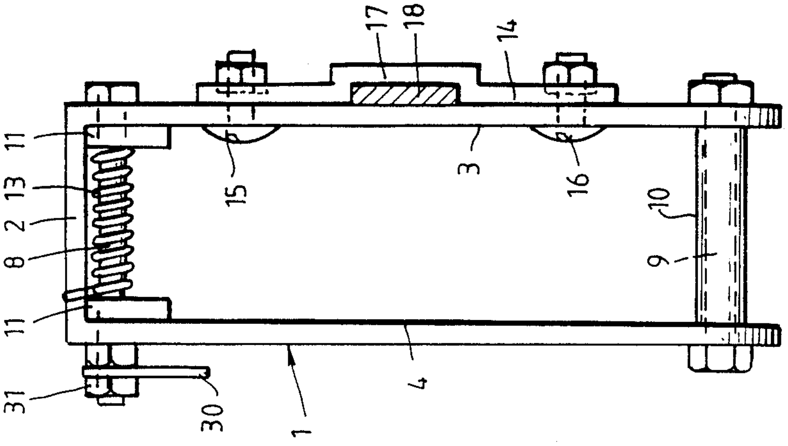
FIG. 2.

CHAIN SAW SAFETY GUARD

FIELD OF THE INVENTION

This invention relates to protective devices for chain saws, and more particularly to chain saw guards of the type which reduce the possibility of injury when a chain saw is used.

BACKGROUND OF THE INVENTION

The increasing use of chain saws has resulted in an increasing number of chain saw accidents, many of which are extremely serious. One of the primary causes of accidents involving chain saws is the problem of chain saw kickback. Kickback usually occurs when the chain first engages the object to be cut and can cause the saw to fly out of control, often rotating in the air and striking the user while the blade is still in motion.

Many chain saws now include safety devices such as chain brakes which are intended to operate when kickback occurs. However, the operating mechanisms for such devices often become clogged with saw dust preventing proper operation and the brake mechanisms involved may not be properly serviced thereby resulting in operational failures in use. Certainly, the increasing incidence of chain saw accidents would seem to indicate that such mechanisms have not been entirely effective.

Other forms of safety devices have also been proposed over the years including that shown in U.S. Pat. No. 4335513 Owens. This patent describes a bar which is pivotted to the handle of the chain saw to overlie the top run of the chain at a fixed spacing therefrom to avoid contact between the chain and the bar. While the concept behind the safety bar described in this patent is commendable, the device has never been commercialized and suffers from a number of disadvantages. Firstly, the device is only suitable for "in line" chain saw handles, that is, where the handle is situated in alignment with the cutter bar of the saw, and such chain saws are quite rare. Secondly, the mounting of the safety bar on the handle of the chain saw prevents the use of the device with chain saws having chain brakes or anti-vibration devices fitted thereto, since such devices occupy the space in which the safety bar is intended to be positioned. Thirdly, the mounting of the safety bar on the handle of an existing chain saw would severely weaken the strength of the handle so that the device is really only suitable for use with a handle which is has been specifically manufactured with a mounting fitting adapted to accept the pivot mechanism for the safety bar. Fourthly, the device must be manually pivotted to enable boring or undercut operations to be performed and since this reduces the control which the operator has over the saw, such an operation is regarded as being potentially dangerous.

SUMMARY OF THE INVENTION AND OBJECTS

It is an object of the present invention to provide an improved protective device for a chain saw which is capable of being securely fitted to an existing chain saw and which at least reduces the difficulties associated with the other shortcomings described above.

In one form, the present invention provides a protecting device for a chain saw including chain bar mounting nuts, comprising mounting bracket means, pivot means carried by said bracket means, and elongate protecting bar attached to said pivot means, means for biasing said bar towards a rest position in which the bar extends in use generally parallel to the chain of said chain saw, said bracket means including provision for attachment of said bracket means to the body of the chain saw by means of the chain bar mounting nuts thereof.

BRIEF DESCRIPTION OF THE DRAWINGS

Two presently preferred embodiments of the invention will now be described with reference to the accompanying drawings in which:

FIG. 1 is a fragmentary side elevation of a protected device embodying the invention showing one manner of fitting to a chain saw;

FIG. 2 is a sectional end elevation of the device shown in FIG. 1 taken along the line 2—2 of FIG. 1;

FIG. 3 is a sectional end elevational of the protection bar taken along the line 3—3 in FIG. 1;

FIG. 4 is a perspective view of the mounting plates associated with the mounting bracket for the protective device shown in FIG. 1;

FIG. 5 shows schematically how the protective device operates to allow the chain saw to be used effectively, and FIG. 6 is a fragmentary elevation of a modification showing the use of upper and lower protection bars, and FIG. 7 is a detailed view of a modified end fitting for the protecting bar.

DESCRIPTION OF PREFERRED EMBODIMENTS.

Referring firstly to FIGS. 1–4 of the drawings, the chain saw protective device embodying the invention will be seen to comprise a mounting bracket 1 of rectangular U-shaped configuration in end elevation (see FIG. 2) having a top member 2 from which depend side members 3 and 4, each of which is provided with forwardly projecting portions 5 which are shaped to define saw dogs 7. The forwardly projecting portions 5 of side portions 3 and 4 support a pivot bolt 8 which is positioned forwardly of and parallel to the top member 2, as well as a bolt 9 carrying a rotatable sleeve which is positioned adjacent the free end of the side members 3 and 4 to rigidly space the side members 3 and 4 and to provide a rotatable contact which prevents significant damage in the event that the chain contacts the sleeve 10.

The pivot bolt 8 carries a short support bar 11 of rectangular channel-shaped configuration which in turn carries an elongate protection bar 12 which is detachably secured to the support bar 11. A torsion spring 13 surrounds the pivot bolt and engages the support bar 11 and the top member 2 of the bracket 1 to bias the support bar 11 towards engagement with the top member 2 to maintain the protection bar 12 parallel to the top run of the chain in use.

The mounting bracket 1 carries a first mounting plate 14 which is secured thereto by bolts 15 and 16. The bolts 15 and 16 are received in cross-slotted holes 14*a* and 14*b* formed in the plate 14 to allow for the plate 14 to be adjustably postioned with respect to the bracket 1. The mounting plate 14 is formed with a central shallow channel portion 17 which receives one end of a second mounting plate 18 having a pair of elongate openings 19 and 19*a* by means of which the plate 18 may be bolted to the body of the chain saw using the chain bar securing bolt(s) 20. The end portion of the second mounting plate 18 has its edges formed with serrations 18a and the sides of the channel portion 17 are correspondingly serrated at 17a so that the second mounting plate 18 may be rigidly but adjustably engaged in the channel 17.

The plate 18 is preferably formed with an offset portion 18b to allow the plate to be used for attachment to different types of chain saw. By inverting the plate 18 that portion of the plate 18 having the opening 19a may be laterally repositioned to allow for different positioning of chain bar mounting bolts. The offset 18b further allows for the plates 14 and 18 to be mounted on either side of the mounting bracket 1, and to be mounted with the offset position in or out, thereby effectively laturally repositioning the bracket 1 and the bar 12 to suit various saws.

While the first and second mounting plates 14 and 18 may be manufactured as a single piece to suit a particular make of chain saw or range of chain saws, the above described connection between the plates 14 and 18 is preferred since it allows the mounting bracket 1 to be secured to the widest range of different types of chain saws. In some instances it may be necessary to position packing washers between the body of the chain saw and the plate 18 to facilitate rigid connection of the plate by means of the chain bar bolts. Similarly, the structure of the mounting bracket 1 may be modified to enable its direct attachment to the chain bar mounting bolt(s) or to a specifically provided mounting point on the body of the chain saw. Of course, different components may be provided to enable the device to be connected to chain saws having widely varying types of chain bar mounting bolts and in this regard the above described combination of plates 14 and 18 may be found to be most convenient.

The protecting bar 12 is in the present embodiment made from extruded PVC or the like and has a generally U-shaped cross-section with downwardly depending legs 19 and 20 formed with ribs 21 positioned to engage groove(s) 21a formed in the sides of the support bar 11. The bar 12 is also formed with opposed grooves 22 within which edges of a protective steel or other strip 23 may be received to reduce damage to the bar in the event that chain contact occurs. The strip 23 is held in position by bending its ends in the manner shown in FIG. 1 over the top of the bar 12.

The bar 12 also supports a shaped end fitting 24 of moulded plastics material which extends from the end of the bar and has a generally curved nose portion which promotes outward deflection of the bar on engagement with an object to be cut by the chain saw. It will be noted from FIG. 1 of the drawings that the end of the bar 12 and the end fitting 24 project beyond the end of the chain saw in use and an overhang of the order of 100 mm has been found to be satisfactory. This overhang allows the bar 12 to be pivotted away from the chain saw by engagement with the object to be cut to enable boring and undercut operations to be performed without the need to manually pivot the bar 12.

The different modes of operation of a chain saw fitted with the protective device embodying the invention will be clearly understood from the schematic representations appearing in FIG. 5 of the drawings. It will be appreciated that a normal top cut will cause the bar 12 to be pivotted against the action of the spring 13 as the bar engages the top of the object being cut. Boring operations may be performed by engaging the end fitting 24 against the object to be bored to pivot the arm 12 sufficiently so that the end of the chain saw may engage the object. As boring progresses, the bar 12 is progressively pivotted by engagement with the object in the manner shown in FIG. 5.

If desired, the protecting bar 12 may be held out of its operative position by means of a wire stay 26 engaging holes 27 and 28 in the side member 3 and the support bar 11. The stay 26 is preferably formed with an intermediate bend such that in the event that kickback occurs during operation of the chain saw in this mode, the stay 26 will collapse so that the protecting bar 12 may reassume its operative position.

Referring now to FIG. 5 of the drawings, a modification in which an additional safety bar 12 and support bar 11 are pivotally attached to the bolt 9 at the lower end of the (1) to provide protection for the lower run of the chain. The bar 12 at the lower end is preferably longer than the bar 12 at the upper end so that the lower bar may be first displaced to enable normal top cut operations to be performed.

To restrain the mounting bracket 1 against vibration and to further render rigid the attachment of the bracket 1 to the chain saw, a short stabilizing link 30 may be attached to the bolt 8 by means of a nut 31, with the opposite end of the link 30 being attached to the body of the saw using the one of the attachment bolts used to attach the saw dogs present on most chain saws. The stabilizing link 30 is most useful where the chain bar is attached by means of a single bolt or nut.

Referring now to FIG. 7, it will be noted that the end fitting 24 has been replaced by a rotatable wheel W. This arrangement ensures that the bar 12 will move smoothly over the object to be cut on initial contact.

It will be appreciated from the above that the device embodying the invention provides a simple yet effective means of protecting the user against injury in the event of kickback occurring or in the event of mishandling of the chain saw. Of course, no device can offer complete protection against a careless operator but the device according to the invention will provide protection against injuries due to kickback. In addition, the tunnel defined by the U-shaped protecting bar 12 provides a passage for saw dust which is carried by the chain to travel to the end of the chain rather than spraying upwardly from the top of the chain as normally occurs. This provides an additional safety feature and reduces the extent to which the user is fouled by sawdust. The attachment of the device in a secure manner to the body of the chain saw, most preferably via the chain bar securing bolt(s) provides a particularly secure means of attachment to the chain saw. In the preferred form described above, the use of interchangeable mounting plates enables the device to be fitted to the widest possible range of different makes and models of chain saw thereby enabling wide spread use of the protective device.

The claims form part of the disclosure of this specification.

We claim:

1. A protecting device for a chain saw including chain bar mounting nuts, comprising mounting bracket means, pivot means carried by said bracket means, an elongate protecting bar attached to said pivot means, means for biasing said bar towards a rest position in which the bar extends in use generally parallel to the chain of said chain saw, said bracket means including provision for attachment of said bracket means to the body of the chain saw by means of the chain bar mounting nut(s) thereof and wherein said mounting bracket means includes a member having a top portion and depending side portions which in use are positioned on either side of the chain bar of the chain saw, said pivot means being carried by said side portions adjacent said top portion and said protecting bar being positioned so that a portion thereof engages said top portion to maintain said bar in its rest position, said provision for attachment of said bracket means to the body of the chain saw being formed in or attached to one of said side portions.

2. The protective device of claim 1, wherein said protecting bar is of inverted channel-shaped cross-sectional configuration, said top portions and depending side portions defining a similar inverted channel-shaped cross-sectional configuration, said side portions extending forwardly of said top portion and said pivot means being carried by said forward extension such that said protecting bar may be pivoted to a substantially perpendicular position relative to said top portion.

3. The protective device of claim 1, wherein at least one of said side portions extends forwardly of said top portion and is formed with projections which act as saw dogs.

4. The protective device of claim 1, wherein said mounting bracket means further includes mounting plate means removably attached to one side member of said member, said mounting plate means including a rearwardly extending portion having one or more openings through which the chain bar mounting bolts may pass.

5. The protective device of claim 4, wherein said mounting plate means comprises a first plate having openings through which attaching bolts may pass to secure said first plate to one side member of said member, said first plate having a transverse recess receiving one end of a second mounting plate formed with said opening(s), and means in said recess and on said end portion to facilitate adjustable interlocking of said first and second plates.

6. The protective device of claim 5, wherein said second mounting plate is formed with an offset position to allow the plates to be mounted on either side of said mounting bracket means.

7. A protective device for a chain saw comprising mounting bracket means formed for attachment to the body of a chain saw, pivot means carried by said mounting bracket means, an elongate protecting bar attached to said pivot means, means for biasing said bar towards a rest position in which the bar extends in use generally parallel to the chain of said chain saw, said bar having a length such that the bar extends in use beyond the end of the chain saw and including nose means on said bar extending a distance sufficient to enable engagement between the bar and an object to be cut without contact between the chain saw and the object whereby to permit entry of the object to be cut between the bottom of said bar and the upper run of said saw.

8. The protective device of claim 7, wherein said protecting bar is formed with means for receiving a cutting resistant strip which in use faces the chain of the chain saw to minimize damage in the event of contact between the bar and the chain.

9. The protective device of claim 7, wherein said protecting bar is made from molded plastics material and includes a removable mounting bar attached to said pivot means.

10. The protective device of claim 1 or 7, further comprising an additional protecting bar pivotally mounted to said mounting bracket means adjacent the lower most end thereof such that the further protecting bar extends in use generally parallel to the lower run of the chain of said chain saw.

11. A protective device for a chain saw comprising a mounting bracket means formed for attachment to the chain saw, pivot means carried by said mounting bracket means, an elongate protecting bar attached to said pivot means, means for biasing said bar towards a rest position in which the bar extends in use generally parallel to the chain of said chain saw, wheel means rotatably mounted at the free end of said protecting bar such that the outer periphery of said wheel means extends in use beyond the end of the chain saw to facilitate engagement between said wheel means and an object to be cut without contact between the chain saw and the object whereby to permit entry of the object to be cut between the bottom of said bar and the upper run of said saw.

* * * * *